(12) United States Patent
Son

(10) Patent No.: US 10,700,584 B2
(45) Date of Patent: Jun. 30, 2020

(54) LINEAR VIBRATION MOTOR THAT VIBRATES HORIZONTALLY

(71) Applicant: Mplus Co., Ltd., Suwonsi, Gyeonggi-do (KR)

(72) Inventor: Yeon Ho Son, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 357 days.

(21) Appl. No.: 15/391,961

(22) Filed: Dec. 28, 2016

(65) Prior Publication Data
US 2017/0250596 A1 Aug. 31, 2017

(30) Foreign Application Priority Data
Feb. 29, 2016 (KR) .......................... 10-2016-0024221

(51) Int. Cl.
*H02K 33/02* (2006.01)
*H02K 33/16* (2006.01)
(Continued)

(52) U.S. Cl.
CPC .............. *H02K 33/02* (2013.01); *H02K 1/12* (2013.01); *H02K 1/34* (2013.01); *H02K 7/08* (2013.01); *H02K 33/16* (2013.01)

(58) Field of Classification Search
CPC ........ H02K 16/00; H02K 33/12; H02K 33/02; H02K 33/16; H02K 33/00; H02K 33/18;
(Continued)

(56) References Cited

U.S. PATENT DOCUMENTS 5,763,965 A * 6/1998 Bader ..................... B23Q 1/62
310/12.06
2011/0239383 A1* 10/2011 Nishiura ............ A61C 17/3445
15/22.1
(Continued)

FOREIGN PATENT DOCUMENTS

CN 103248755 A 8/2013
CN 104052228 A 9/2014
(Continued)

OTHER PUBLICATIONS

SIPO Office Action for Chinese Patent Application No. 201710083113.6 dated Oct. 31, 2018 which corresponds to the above-referenced U.S. application.
(Continued)

*Primary Examiner* — Bryan R Perez
(74) *Attorney, Agent, or Firm* — LRK Patent Law Firm

(57) ABSTRACT

A linear vibration motor includes a bracket, a coil provided to the bracket, a case for covering the bracket, a mass positioned in the case, at least two or more springs, each of which one end is connected to the mass and the other end is connected to one surface of the case, a magnet coupled to the mass to be integrated therewith and facing the coil, a plate coupled to the mass to be integrated therewith and positioned on the magnet, and a friction reducing part provided on at least one surface of the mass and reducing friction between the mass and the bracket. The mass vibrates in the horizontal direction such that the thickness of the linear vibration motor is not increased but can be manufactured thin. Therefore, it is advantageous in terms of space when the linear vibration motor is arranged in a mobile phone.

7 Claims, 11 Drawing Sheets

(51) Int. Cl.
*H02K 1/12* (2006.01)
*H02K 1/34* (2006.01)
*H02K 7/08* (2006.01)

(58) Field of Classification Search
CPC . H02K 41/0356; H02K 7/063; A61C 17/3445
See application file for complete search history.

(56) References Cited

U.S. PATENT DOCUMENTS

| | | | | |
|---|---|---|---|---|
| 2012/0119595 | A1* | 5/2012 | Choi | B06B 1/045 310/25 |
| 2013/0293728 | A1* | 11/2013 | Ohashi | G03B 5/00 348/208.11 |
| 2014/0152126 | A1* | 6/2014 | Kim | B06B 1/045 310/25 |
| 2018/0281020 | A1* | 10/2018 | Katada | H02P 25/032 |

FOREIGN PATENT DOCUMENTS

| | | |
|---|---|---|
| KR | 10-2006-0120859 A | 11/2006 |
| KR | 10-2011-0011117 A | 2/2011 |
| KR | 10-2014-0112648 A | 9/2014 |
| KR | 10-2015-0132947 A | 11/2015 |

OTHER PUBLICATIONS

KIPO Office Action for Korean Patent Application No. 10-2016-0024221 dated Jun. 26, 2017 which corresponds to the above-referenced U.S. application.

SIPO Office Action for Chinese Patent Application No. 201710083113.6 dated Jun. 19, 2019 which corresponds to the above-referenced U.S. application.

* cited by examiner (a)

(b)

(c)

(d)

(e)

(a)

(b)

(a)

(b)

(a)

(b)

(a)

(b)

(c)

LINEAR VIBRATION MOTOR THAT VIBRATES HORIZONTALLY

CROSS REFERENCE TO RELATED APPLICATION

The present application claims the benefit of Korean Patent Application No. 10-2016-0024221, filed in the Korean Intellectual Property Office on Feb. 29, 2016, the entire contents of which are incorporated herein by reference.

BACKGROUND OF THE INVENTION

1. Field of the Invention

An exemplary embodiments relates to a linear vibration motor that vibrates horizontally, and more particularly, to a linear vibration motor, in which the motor vibrates in the horizontal direction and a friction part is formed using the magnetic unbalance of a magnet in a motor driving part and provided with a sliding structure or a bearing so as to minimize friction and abrasion with respect to corresponding elements as well as noise resulted therefrom.

2. Description of Related Art

Recently, one of the most important functions of a receiving device represented by a mobile phone is a notification function that informs the receiving of a signal, and such notifications are carried out by the bell or vibration. In particular, vibration notifications have become an essential element of a mobile phone in order to avoid harming others or to recognize receiving notifications where the ringtone is hard to recognize.

A vibration motor is used as such a vibration generating means, wherein vibration is generated by rotating a motor, in which the shaft of the motor is eccentric or the center of gravity is disproportionately distributed to one side. However, such a vibration motor has disadvantages that a brush passes through the gaps between segments during the rotation of the motor such that mechanical friction and electric spark occur, reducing the lifespan thereof. In addition, it takes a long time to reach a target vibration amount due to the rotational inertia when the motor is applied with a voltage, thereby resulting in the difficulty in the implementation of appropriate vibration in a touch screen phone.

In order to overcome the disadvantages of the vibration motor described as above, linear vibration motors have been developed so far. The linear vibration motors have been developed in various forms with advantages that no mechanical friction is generated and miniaturization can be realized since a vibrator mounted on a plate spring vibrates by the electromagnetic force between a magnet and a coil. Herein, the electromagnetic force is generated by the interaction between the magnet positioned in a movement part and a direct current or an alternating current, which flows through the coil provided to a stator.

Such a linear vibration motor is usually positioned at the corner portion of a cell phone so as to generate vibration in the vertical direction on an LCD screen.

The linear vibration motor, which is designed to vibrate in the vertical direction, can generate vibrations by ensuring the vertical displacement of the vibrator. However, there is a limitation in increasing the thickness so as to increase the amount of vibration due to the limit of a mounting space in the mobile phone.

In order to overcome the disadvantages of the prior art linear vibration motor, there may be a solution that a mass in the linear vibration motor moves in the horizontal direction. However, if the mass vibrates horizontally, there may arise a problem that the durability or lifespan of the linear vibration motor may be reduced due to the friction possibly generated between a case or a bracket, which encompasses the mass, and the mass itself. Accordingly, an exemplary embodiments proposes a linear vibration motor, in which the friction between a mass and other constituent elements can be prevented while ensuring the horizontal vibration of the mass.

PRIOR ART DOCUMENT

Patent Document

Patent Document 1: Korean Patent Laid-open Publication No. 2015-0132947 (published on 27 Nov. 2015)

SUMMARY OF THE INVENTION

Accordingly, an exemplary embodiments has been made to solve the disadvantages of the linear vibration motor, of which mass vibrates in the vertical direction, and it is an objective of an exemplary embodiments to provide a linear vibration motor, in which a mass vibrates in the horizontal direction and the friction generated between the mass and other constituent elements while the mass vibrates in the horizontal direction can be prevented.

To accomplish the above objective, according to an embodiment of the present invention, there is provided a linear vibration motor, including a bracket, a coil provided to the bracket, a case for covering the bracket, a mass positioned in the case, at least two or more springs, each of which one end is connected to the mass and the other end is connected to one surface of the case, a magnet coupled to the mass so as to be integrated therewith and facing the coil, a plate coupled to the mass so as to be integrated therewith and positioned on the magnet, and a friction reducing part provided on at least one surface of the mass and reducing friction between the mass and the bracket.

Herein, the mass is made of a tungsten material and the bracket is made of a magnetic material.

Besides, the friction reducing part is a ball bearing provided between the mass and the bracket, the mass includes a recessed ball bearing seat, on which the ball bearing can be mounted, and the bracket has a guide groove formed along a path, through which the ball bearing moves.

According to another embodiment of the present invention, the bracket includes a recessed ball bearing seat, on which the ball bearing can be mounted, and the mass has a guide groove formed along a path, through which the ball bearing moves.

According to another embodiment of the present invention, the friction reducing part is a protrusion, which is protruded from a part of the bottom surface of the mass so as to come into contact with the bracket, and the bracket has a guide groove formed along a path, through which the mass moves.

According to another embodiment of the present invention, the friction reducing part is a protrusion, which is protruded from a part of the top surface of the bracket so as to come into contact with the mass, and the mass has a guide groove formed along a path, through which the protrusion of the bracket moves.

According to another embodiment of the present invention, the friction reducing part is a rod-shaped roller provided between the mass and the bracket, the mass includes a recessed roller seat, on which the roller can be mounted, and the bracket includes a recessed roller seat, on which the roller can be mounted.

According to another embodiment of the present invention, the roller is positioned at the corner of the mass in a direction parallel to the spring and the mass includes a recessed roller seat, on which the roller can be mounted.

According to another embodiment of the present invention, a linear vibration motor includes a case, a coil provided to the case, a mass positioned in the case, at least two or more springs, each of which one end is connected to the mass and the other end is connected to one surface of the case, a magnet coupled to the mass so as to be integrated therewith and facing the coil, and a friction reducing part provided on at least one surface of the mass and reducing friction between the mass and the case.

The friction reducing part is a protrusion, which is protruded from a part of the bottom surface of the mass so as to come into contact with the case.

Furthermore, the friction reducing part may be a protrusion, which is protruded from a part of the top surface of the mass so as to come into contact with the case, as well as a protrusion, which is protruded from a part of the side surface of the mass so as to come into contact with the case.

According to the present invention, the mass vibrates in the horizontal direction such that the thickness of the linear vibration motor is not increased but can be manufactured thin. Therefore, it is advantageous in terms of space when the linear vibration motor is arranged in a mobile phone.

Furthermore, it is possible to minimize the noise or friction, which may occur as the mass vibrates horizontally, by using bearings, rollers or guide grooves, thereby increasing the durability of the linear vibration motor.

DETAILED DESCRIPTION OF THE PREFERRED EMBODIMENTS

Hereinafter, with reference to the attached drawings, preferred embodiments of an exemplary embodiments will be described in detail. In connection with adding reference signs to the constituent elements in each of the drawings, the same constituent elements have the same reference signs as far as possible even though they are illustrated in different figures. Further, in the following description of embodiments of the present invention, the detailed description of known functions and configurations will be omitted if those description is determined to interfere with the understanding of the embodiments of the present invention.

In addition, the terms such as first, second, A, B, a, b and the like can be used in explaining the constituent elements of the example embodiments of the present invention. These terms are simply used to distinguish corresponding constituent elements from other constituent elements but not intended to limit the nature of the corresponding component elements by the terms. Additionally, it should be also understood that the expression that some component is "connected", "coupled" or "linked" to another component means that some component is directly connected to another component or is indirectly "connected", "coupled" or "linked" to another component through a further component interposed between each of the components.

Figure 1:
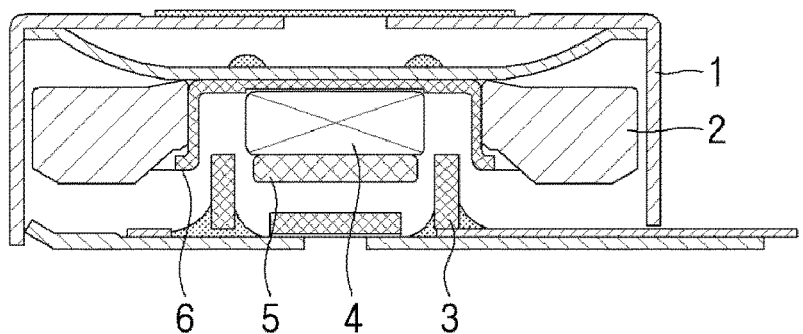
FIG. 1 shows a prior art vibration motor, of which mass moves in the vertical direction.

FIG. 1 shows a prior art vibration motor, of which mass moves in the vertical direction. As shown in FIG. 1, a prior art linear vibration motor includes a vibrator 2 provided to the inside of a case 1, a coil 3, a magnet 4, a plate 5 and a yoke 6, wherein the vibrator 2 vertically vibrates by the electromagnetic force between the coil 3 and the magnet 4. The prior art linear vibration motor, which is designed to vibrate in the vertical direction, can generate vibration by ensuring the vertical displacement of the vibrator for the movement of the vibrator. However, there is a limitation in increasing the thickness of a mobile phone so as to increase the amount of vibration due to the limit of a mounting space in the mobile phone.

In order to overcome the disadvantages of the prior art linear vibration motor, there may be a solution that a mass in the linear vibration motor moves in the horizontal direction. However, if the mass vibrates horizontally, there may arise a problem that the durability or lifespan of the linear vibration motor may be reduced due to the friction possibly generated between a case or a bracket, which encompasses the mass, and the mass itself. Hereinafter, an exemplary embodiments proposes a linear vibration motor, in which the friction between a mass and other constituent elements can be prevented while ensuring the horizontal vibration of the mass.

Figure 2:
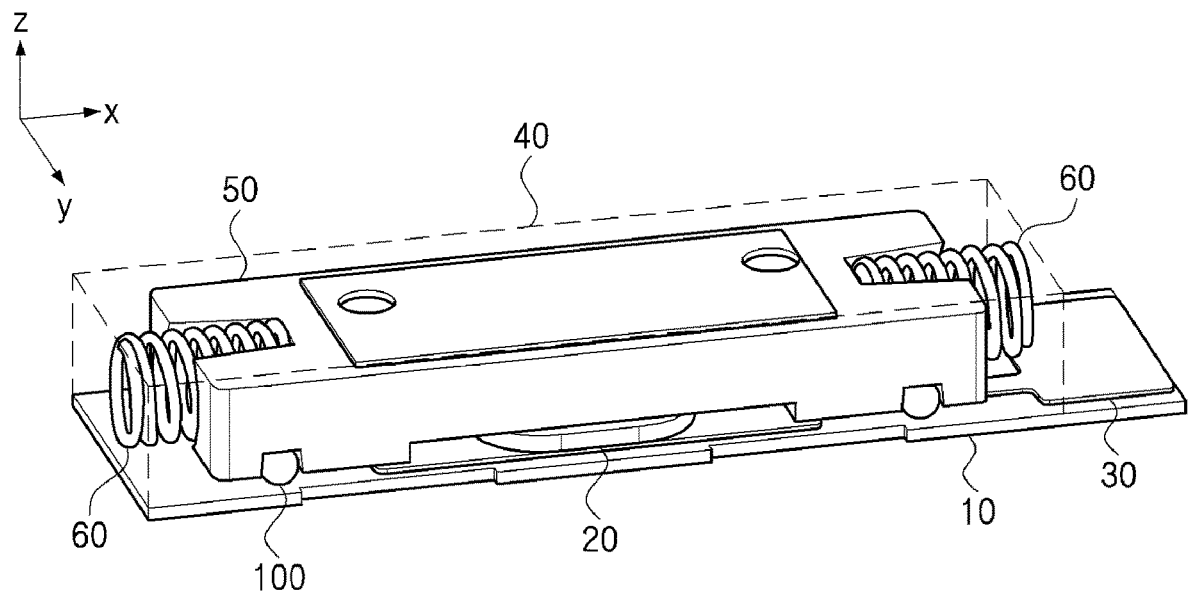
FIG. 2 shows a perspective view of a linear vibration motor according to an embodiment of the present invention.
Figure 3:
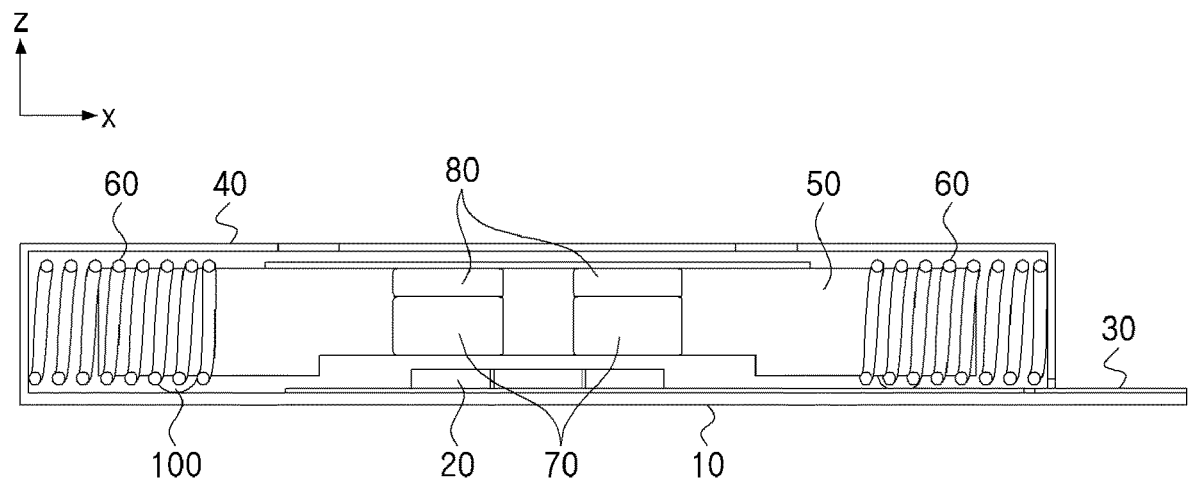
FIG. 3 shows a cross-sectional view of the linear vibration motor of FIG. 2.

FIG. 2 shows a perspective view of a linear vibration motor according to an embodiment of the present invention, and FIG. 3 shows a cross-sectional view of the linear vibration motor of FIG. 2.

Hereinafter, a linear vibration motor according to an embodiment of an exemplary embodiments will be described with reference to FIG. 2 and FIG. 3. FIG. 2 and FIG. 3 show a bracket 10, a coil 20, a case 40, a mass 50, a spring 60, a magnet 70, a plate 80 and a bearing. In the drawings, coordinate axes serving as criteria are set for the convenience of description. FIG. 3 shows the cross-sectional view of the linear vibration motor shown in FIG. 2, which is cut in a direction perpendicular to axis y. Even though the mass 50 moves with reference to axis z in the prior art vibration motor, the mass 50 has displacement with reference to axis x in the linear vibration motor according to the present invention.

The bracket 10 and the case 40 form the appearance of the linear vibration motor. The case 40 is formed in the shape of a rectangle, in which a bottom surface is opened, and the bracket 10 is coupled to the case 40 so as to close the opened surface portion of the case 40. The case 40 is coupled to the bracket 10 so as to cover the bracket 10, but is not necessarily limited to the rectangular shape. The case 40 may be formed through various modifications as far as the mass 50 to be positioned in the case 40 can be provided in an appropriate shape to carry out exercise in the direction of axis x. In FIG. 2, the corners of the case 40 are shown by dotted lines in order to show the inner constituent elements of the case 40.

The bracket 10 is provided with the coil 20. The surface to which the coil 20 is provided corresponds to the surface forming the inside of the linear vibration motor. The coil 20 is fixed to the bracket 10, wherein a power line is also provided to the bracket 10 to allow a current to flow through the coil 20. As for the power line, a flexible printed circuit board FPCB 30 is typically used, wherein the FPCB 30 means a wiring board using a flexible insulating substrate. The mass 50 is provided to the inside of the case 40. The mass 50 vibrates in the direction of axis x, thereby implementing the vibration of the linear vibration motor. Therefore, the mass 50 has to be made of a material having an appropriate mass and preferably has the weight heavier than iron. In general, the mass 50 is made of a tungsten material in order to maximize vibration.

It is preferable that the mass 50 vibrates only in the direction of axis x in the case 40. To this end, the spring 60 is employed. The spring 60 serves to restrain the movement of the mass 50 in the direction of axis x. To this end, it is necessary that one end of the spring 60 is connected to the mass 50 and the other end thereof is connected to one surface of the case 40. Herein, it is preferable that the one surface of the case 40 is perpendicular to the axis x. There is no particular limitation in the number of such a spring 60, and at least two or more springs 60 have to be provided since the springs 60 have to restrain the mass 50 with respect to both side surfaces of the case 40. Referring to FIG. 2 and FIG. 3, two springs 60 are typically used, and the springs 60 are respectively fixed on two surfaces of the case 40, which are perpendicular to axis x.

The magnet 70 and the plate 80 are positioned in the mass 50. The magnet 70 interacts with the coil 20 and serves to move the mass 50 by receiving the electromagnetic force through the interaction. Therefore, in order to efficiently interact with the coil 20, it is preferable that the magnet 70 is positioned in the vicinity of the coil 20 and facing the coil 20. Referring to FIG. 2 and FIG. 3, the magnet 70 is positioned at the upper portion of the coil 20. There is no particular limitation in the number of such a magnet 70, but two magnets 70 are typically shown in FIG. 2 and FIG. 3.

The plate 80 is positioned in the mass 50 at the upper portion of the magnet 70. Even though the mass 50 is constrained in the direction of axis x in the case 40, the mass 50 can move in the direction of axis z since the mass 50 is constrained by the spring 60 only. Since a device incorporating a linear vibration motor can be placed in various directions, the linear vibration motor can also be placed in an upside down form. Therefore, it is preferable to constrain the mass 50 with respect to axis z in consideration of the gravity applied to the mass 50, the case where the linear vibration motor is inverted or impacted and the like.

To this end, an exemplary embodiments employs the principle of pulling the mass 50 towards the bracket 10 side by using the magnetic flux generated from the coil 20. Since the magnetic flux must be unbalanced in order to generate the attractive force, the bracket 10 employs a magnetic material to maximize the leakage flux in the direction of axis −z and the plate 80 is provided on the magnet 70 so as to block the leakage flux in the direction of axis +z.

Therefore, the magnetic unbalance of the leakage magnetic flux is generated with respect to axis z such that the mass 50 receives the attractive force in the direction of axis +z. That is, the plate 80 serves to cut off the magnetic flux leaking towards the upper portion of the magnet 70. FIG. 2 and FIG. 3 show that each plate 80 is positioned on top of two magnets 70.

It is preferable that the attractive force applied to the mass 50 has the intensity to maintain a predetermined interval between the mass 50 and the bracket 10. In addition, the attractive force applied to the mass 50 has the intensity to prevent the friction between the mass 50 and the case 40 even if the linear vibration motor is inverted.

However, even though the intensity of the attractive force applied to the mass 50 is adequate, friction may be generated between the mass 50 and the bracket 10 if an impact is applied to the linear vibration motor or the case 40 of the linear motor vibrates itself. If friction is generated between the mass 50 and the bracket 10, the driving part of the linear vibration motor may be damaged and the mass 50 or the bracket 10 may be worn out, resulting in the shortening of the lifespan of the linear vibration motor.

Figure 4:
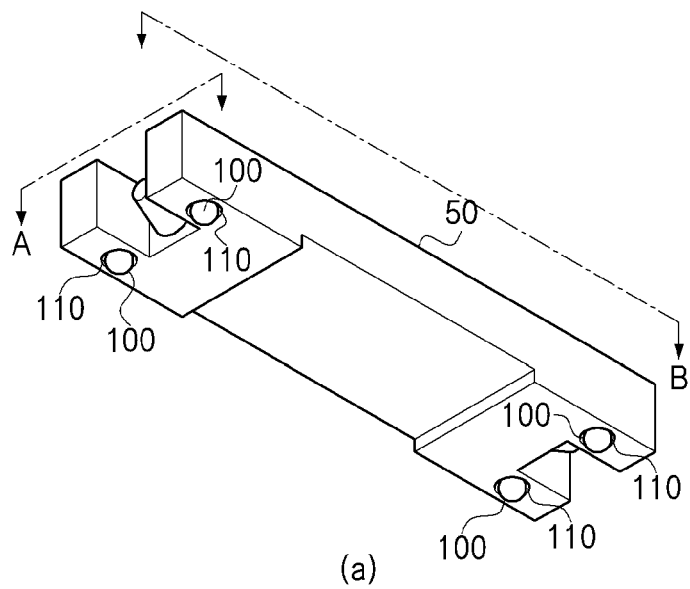
FIG. 4 shows a linear vibration motor including a ball bearing and a ball bearing seat provided to a mass.
Figure 4:
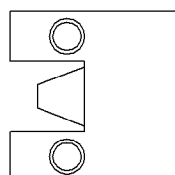
Figure 4:
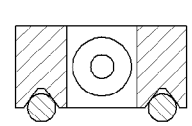
Figure 4:
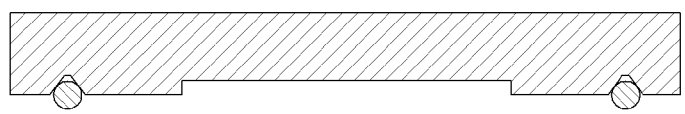
Figure 4:
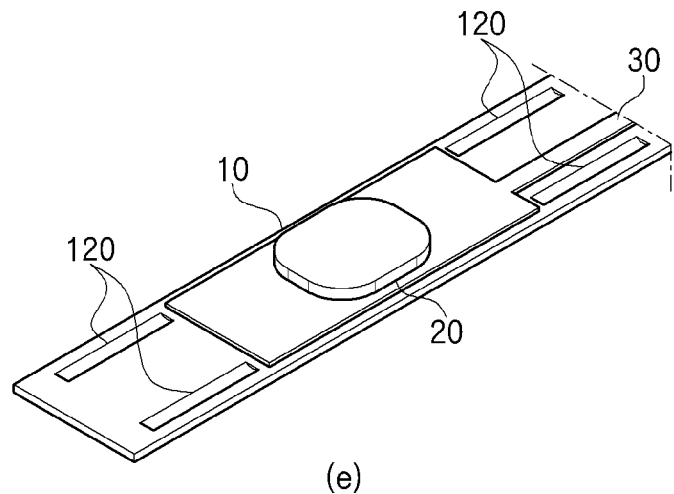

FIG. 4 shows a linear vibration motor including a ball bearing 100 and a ball bearing 100 seat provided to a mass 50. Referring to FIG. 4, the ball bearing 100 may be employed to reduce the friction or abrasion between the mass 50 and the bracket.

In FIG. 4, (a) shows the mass 50 as a whole in the downward direction, (b) shows the mass 50 looked up from below, (c) shows a plane cut along cutting line A of (a), (d) shows a plane cut along cutting line B of (a), and (e) shows the mass 50, which includes a ball bearing seat 110, and a corresponding bracket.

In FIG. 4, (a) shows the mass 50, the ball bearing 100 and the ball bearing seat 110. The ball bearing 100 rolls between the mass 50 and the bracket so as to reduce the friction between the mass 50 and the bracket. The ball bearing 100 is positioned between the mass 50 and the bracket and there is no particular limitation in the number of the ball bearing 100. FIG. 4 shows the use of four ball bearings 100 as a preferred embodiment.

The ball bearing seat 110 is formed by depressing the mass 50 such that the ball bearing 100 is inserted into and seated on the depressed ball bearing seat 110. As the ball bearing 100 is seated on the ball bearing seat 110, the ball bearing 100 is constrained to move in a predetermined direction but not moves randomly in the linear vibration motor. Since the mass 50 vibrates in the direction of axis x as mentioned above, the ball bearing 100 is also constrained to move in the same direction as the mass 50. The ball bearing 100 is not fully inserted into the ball bearing seat 110, as shown in (c) or (d) of FIG. 4, but a part of the ball bearing 100 is preferably protruded to the outside of the mass 50. It is sufficient that the ball bearing seat 110 has a shape, in which only a part of the ball bearing 100 can be mounted thereon. Referring to FIG. 4, the ball bearing seat 110 has a shape with a gradient. The recessed portion of the ball bearing seat 110 becomes wide towards the lower portion of the mass. As the ball bearing seat 110 is formed with a gradient, the ball bearing seat 110 can induce the ball bearing 100 to be stably mounted thereon without any gap or collision.

A ball bearing guide groove 120 is formed along a path, where the ball bearing 100 comes into contact with the bracket according to the vibration of the mass 50, and is composed of a constant depth. The ball bearing 100 moves along the ball bearing seat 110 and the guide groove 120, and the movable range of the ball bearing 100 is restricted. In FIG. 4, (e) shows a bracket with four guide grooves 120 corresponding to four ball bearings 100. The guide groove 120 is formed long, corresponding to the vibration range of the mass 50.

Figure 5:
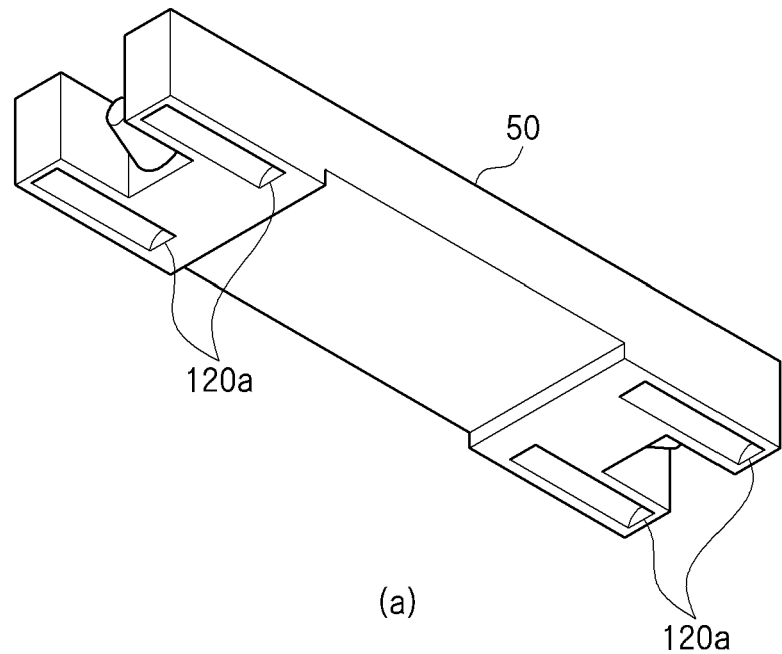
FIG. 5 shows a linear vibration motor including a ball bearing and a ball bearing seat provided to a bracket.
Figure 5:
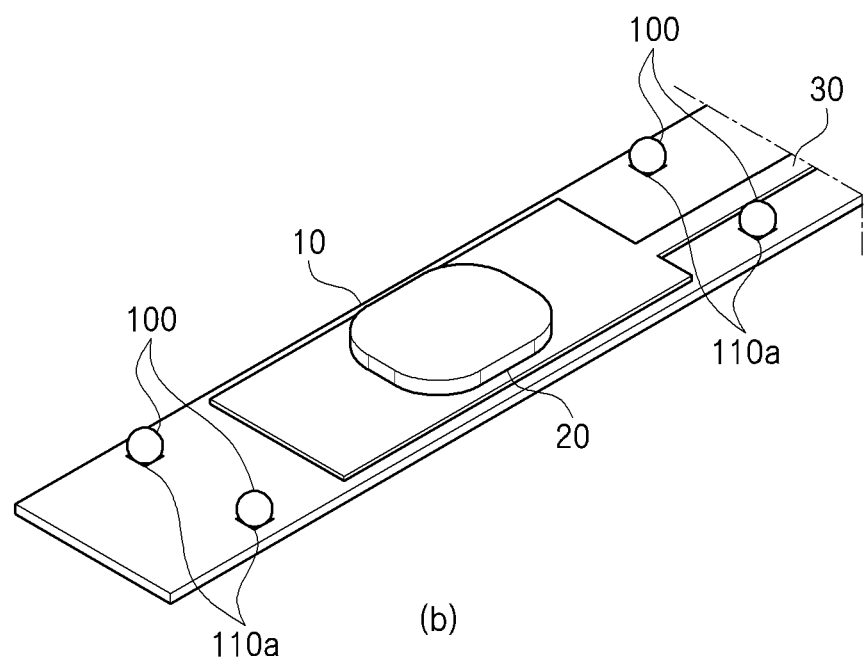

FIG. 5 shows a linear vibration motor, which includes a ball bearing 100 and a ball bearing 100 seat provided to a bracket. In FIG. 5, (a) shows the mass 50, which is formed with a guide groove 120a, on the whole in the downward direction, and (b) shows a bracket corresponding to the mass 50, which includes the guide groove 120a.

In the case of using the ball bearing 100, it is possible to form the ball bearing seat on the mass, as shown in FIG. 4, but it is also possible to form the ball bearing seat on the bracket. When forming a ball bearing seat 110a on the bracket, it is possible to form the guide groove 120a on the mass 50 since the function of the ball bearing seat 110a and the guide groove 120a is to appropriately restrain the movement of the ball bearing 100.

Figure 6:
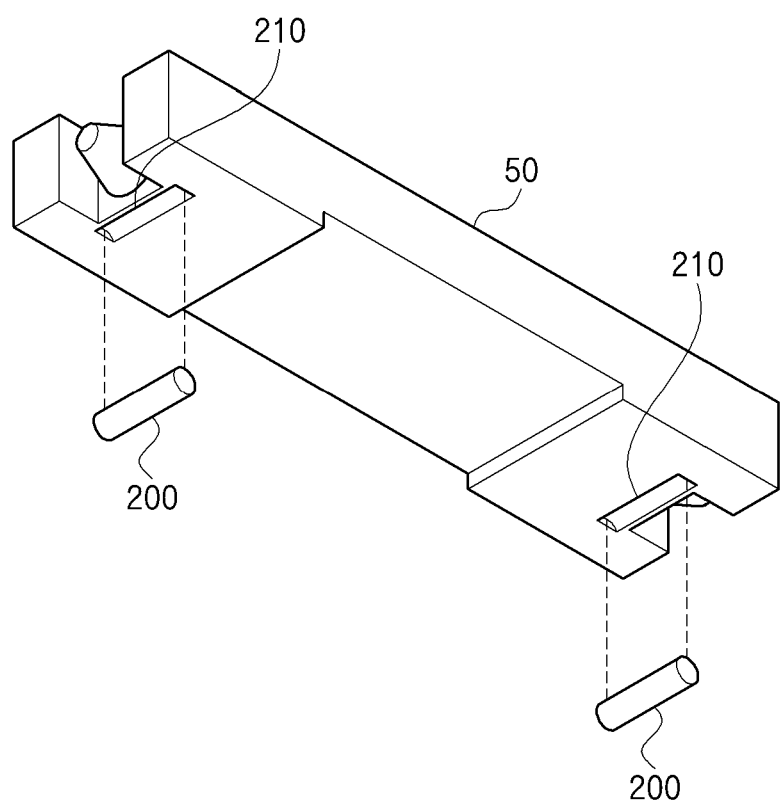
FIG. 6 shows a mass having a roller seat.

FIG. 6 shows a mass having a roller seat. Explaining with reference to FIG. 6, it is possible to use the roller 200 in order to reduce the friction or abrasion between the mass 50 and the bracket. FIG. 6 shows the roller 200 and a roller seat 210.

The roller 200 rolls between the mass 50 and the bracket so as to reduce the friction between the mass 50 and the bracket. The roller is positioned between the mass 50 and the bracket, and there is no particular limitation in the number of the roller. FIG. 6 shows the use of two rollers 200 according to a preferred embodiment of the present invention.

The roller seat 210 is formed by depressing the mass 50 such that the roller 200 is inserted into and seated on the depressed roller seat 210.

As the roller 200 is seated on the roller seat 210, the roller 200 is constrained to move in a predetermined direction but not moves randomly in the linear vibration motor. Since the mass 50 vibrates in the direction of axis x as mentioned above, the roller 200 is also constrained to move in the same direction as the mass 50. The roller 200 is not fully inserted into the roller seat 210, but a part of the roller 200 is preferably protruded to the outside of the mass 50. It is sufficient that the roller seat 210 has a shape, in which only a part of the roller 200 can be mounted thereon.

Figure 7:
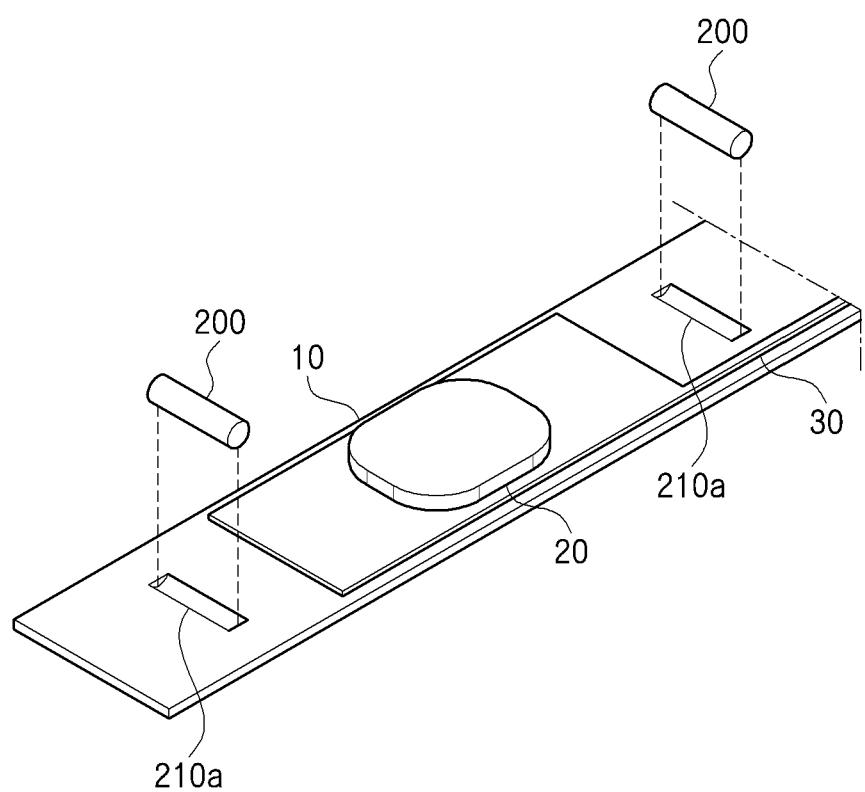
FIG. 7 shows a bracket having a roller seat.

FIG. 7 shows a bracket having a roller seat. When using the roller 200, as shown in FIG. 6, a roller seat may be provided to the mass, but it is also possible to provide the roller seat to the bracket since the function of the roller seat 210a is to appropriately restrain the movement of the roller.

Figure 8:
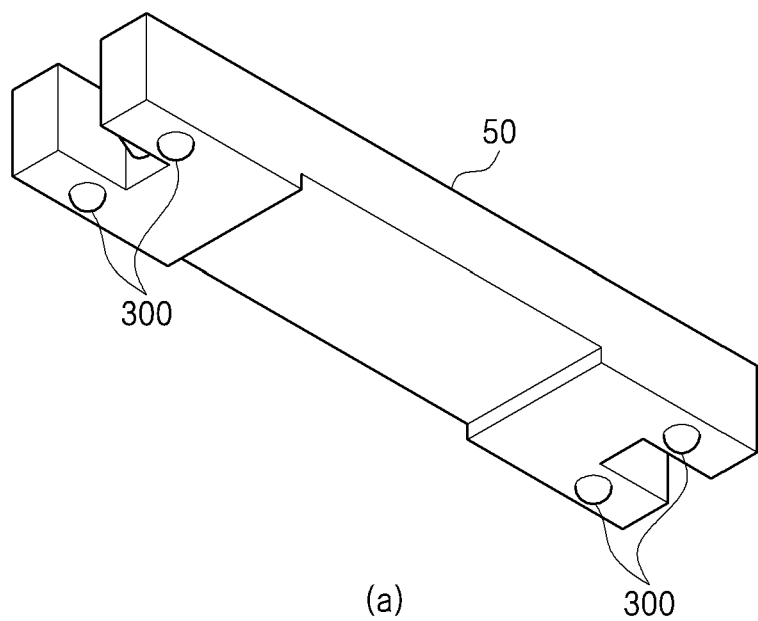
FIG. 8 shows a mass having a protrusion.
Figure 8:
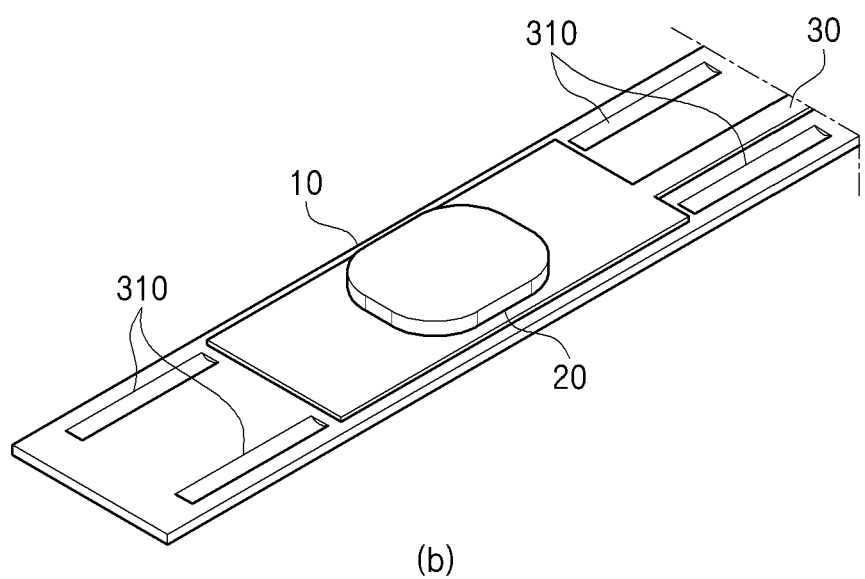

FIG. 8 shows a mass having a protrusion. Explaining FIG. 8, it is possible to form the protrusion on the mass 50 in order to reduce the friction or abrasion between the mass 50 and the bracket. In FIG. 8, (a) shows the mass 50 on the whole in the downward direction, and (b) shows a bracket corresponding to the mass 50, which includes the protrusion 300.

In FIG. 8, (a) shows the mass 50 and the protrusion 300. The protrusion 300 serves to reduce a contact area between the mass 50 and the bracket. The protrusion 300 may be formed by machining the surface of the mass 50 such that the surface becomes smooth or using a material having a small frictional coefficient. The number of the protrusion 300 is not particularly limited. FIG. 8 shows a mass 50 including four protrusions 300 according to a preferred embodiment of the present invention.

A guide groove 310 is formed along a path, where the protrusion 300 comes into contact with the bracket according to the vibration of the mass 50, and is composed of a constant depth. The protrusion 300 moves along the guide groove 310, and the movable range of the protrusion 300 is restricted. In FIG. 8, (b) shows a bracket with four guide groove 310 corresponding to four protrusion 300. The guide groove 310 is formed long, corresponding to the vibration range of the mass 50.

Figure 9:
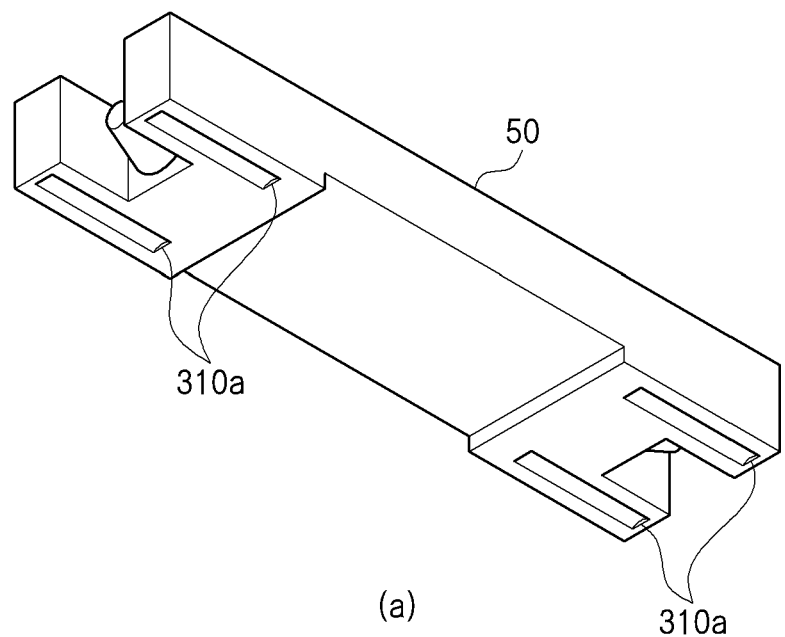
FIG. 9 shows a bracket having a protrusion.
Figure 9:
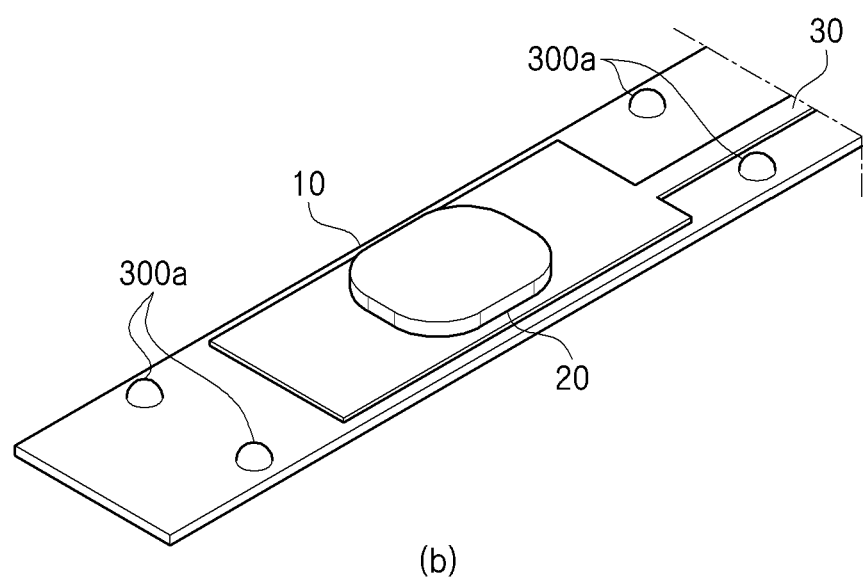

FIG. 9 shows a bracket having a protrusion. In FIG. 9, (a) shows the mass 50, which has protrusion guide groove 310a, on the whole in the downward direction, and (b) shows a bracket corresponding to the mass 50, which includes the protrusion guide groove 310a.

When using the protrusion 300a, as shown in FIG. 8, the protrusion may be provided to the mass, but it is also possible to provide the protrusion to the bracket. When the protrusion 300a is provided to the bracket, a protrusion guide groove 310a may be provided to the mass 50 since the function of the protrusion guide groove 310a is to appropriately restrain the movement of the protrusion 300a.

Figure 10:
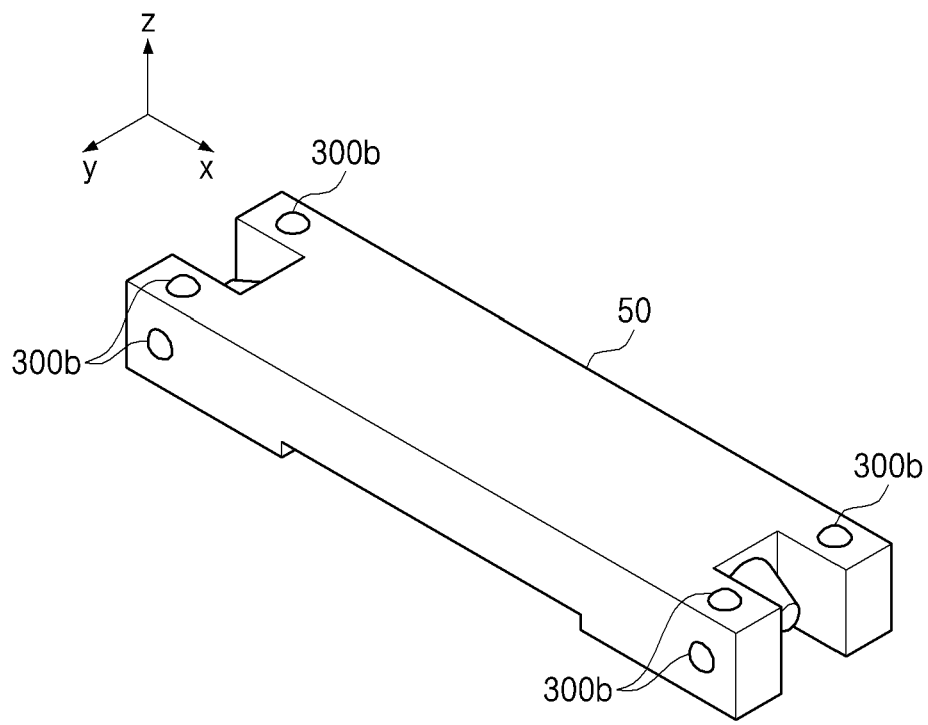
FIG. 10 shows a mass having a protrusion according to another embodiment of the present invention.
Figure 10:
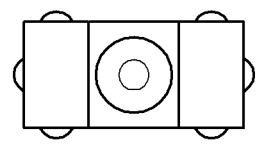
Figure 10:
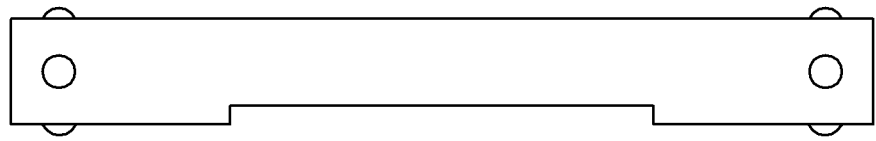
Figure 11:
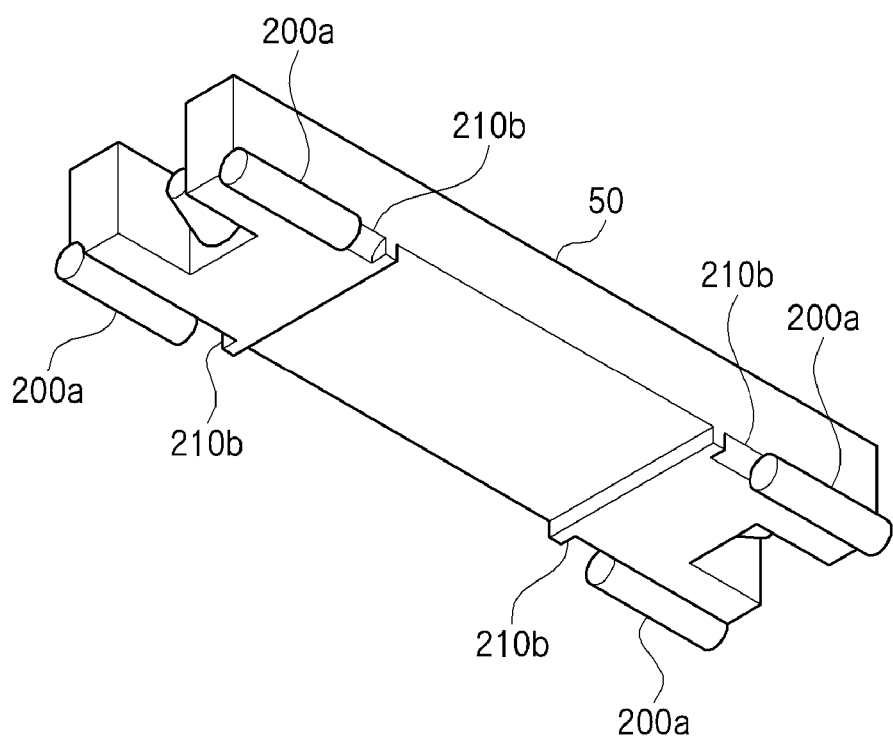
FIG. 11 shows a mass for sliding a roller.

FIG. 11 shows a mass for sliding a roller. Referring to FIG. 11, it is possible to employ a roller 200a in order to reduce the friction or abrasion between the mass 50 and the bracket. FIG. 10 shows the roller 200a and a roller seat 210b.

The roller 200a is provided in a direction parallel to the spring at the corner of the mass 50 and slides between the mass 50 and the bracket so as to reduce the friction between the mass 50 and the bracket. The roller is positioned between the mass 50 and the bracket, and there is no particular limitation in the number of the roller. FIG. 11 shows the use of four rollers 200a according, to a preferred embodiment of the present invention.

The roller seat 210b is formed by depressing the corner of the mass 50 such that the roller 200a is inserted into and seated on the depressed roller seat 210b. As the roller 200a is seated on the roller seat 210b, the roller 200a is constrained to move in a predetermined direction but not moves randomly in the linear vibration motor. Since the mass 50 vibrates in the direction of axis x as mentioned above, the roller 200a is also constrained to move in the same direction as the mass 50. The roller 200a is not fully inserted into the roller seat 210b but a part of the roller 200a is preferably protruded to the outside of the mass 50. It is sufficient that the roller seat 210b has a shape, in which only a part of the roller 200a can be mounted thereon.

FIG. 10 shows a mass having a protrusion according to another embodiment of the present invention. A linear vibration motor, according to this embodiment of the present invention, includes a case, a coil provided to the inside of the case, a mass 50 positioned in the ease, at least two or more springs, each of which one end is connected to the mass 50 and the other end is connected to one surface of the case, a magnet coupled to the mass 50 so as to be integrated with the same and facing the coil, and a protrusion 300b formed on at least one surface of the mass 50 and reducing the friction between the mass 50 and the case.

Differently from the embodiments mentioned hereinabove, the mass 50 is not restrained with respect to axis z. The above-mentioned embodiments employs the principle of pulling the mass 50 towards the bracket by using the magnetic flux generated from the coil. To this end, the plate is provided on the top of the magnet and the bracket is made of a magnetic material in the above-mentioned embodiments.

However, according to the embodiment as shown in FIG. 10, the motor 50 is not restrained with respect to axis z and thus any additional plate is required and the bracket needs not to be formed of the magnetic material.

Therefore, even though the mass 50 is connected to the springs at both sides thereof but can move without any constraint on any of the x, y, and z axes. That is, the mass 50 can cause friction on all surfaces of the case in the case.

In order to reduce the friction between the mass 50 and the case, each protrusion 300b of the mass 50 is correspondingly formed on the remaining surfaces except the surfaces, to which the springs are connected. In FIG. 10, (b) and (c) show that the protrusions 300b are formed on the bottom, top, and side surfaces of the mass 50.

Figure 12:
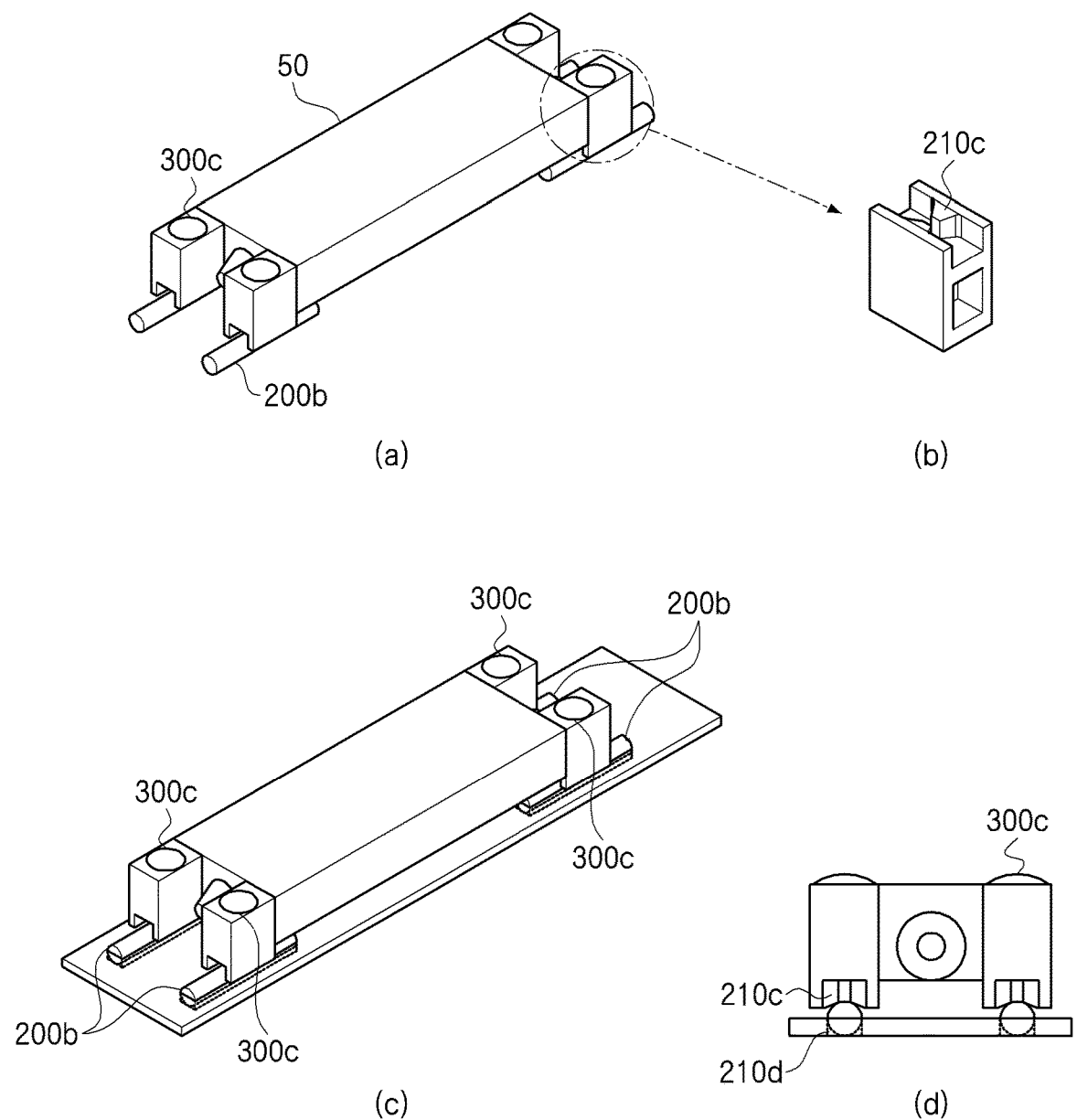
FIG. 12 shows a vibration motor, which includes a roller and a roller seat, according to another embodiment of the present invention.

FIG. 12 shows a vibration motor, which includes a roller and a roller seat, according to another embodiment of the present invention. The linear vibration motor according to the embodiment as shown in FIG. 12, includes a case, a coil provided to the inside of the case, a mass 50 positioned in the case, at least two or more springs, each of which one end is connected to the mass 50 and the other end is connected to one surface of the case, a magnet coupled to the mass 50 so as to be integrated therewith and facing the coil, and a protrusion 300c and roller seats 210c, 210d, which are respectively formed on at least one surface of the roller 200b and at least one surface of the mass 50 so as to reduce the friction between the mass 50 and the case.

In FIG. 12, (a) shows the coupling between the mass 50 and the roller 200b, (b) shows an inverted view of a portion, where the roller 200b is seated on the mass 50, (c) is a perspective view showing the coupling of the mass 50 and the roller 200b and the bottom surface of the case, and (d) shows the coupling result of (c) in a direction parallel to the spring.

The roller 200b is provided in a direction parallel to the spring at the corner of the mass 50 and slides between the mass 50 and the bracket so as to reduce the friction between the mass 50 and the bracket. The roller is positioned between the mass 50 and the bracket, and there is no particular limitation in the number of the roller. FIG. 12 shows the use of four rollers 200b according to a preferred embodiment of the present invention.

The roller seat 210c is formed by depressing and protruding the corner of the mass 50 in the downward direction of the mass 50 such that the roller 200b is inserted into or seated on the depressed roller seat 210c. In addition, a roller seat 210d is formed on the bracket so as to secure the roller 200b together with the roller seat 210c of the mass 50. As the roller 200b is seated on the roller seats 210c and 210d, the roller 200b is constrained to move in a predetermined direction but not moves randomly in the linear vibration motor. The roller 200b is not fully inserted into the roller seats 210c and 210d, but a part of the roller 200b is preferably protruded to the outside of the mass 50. It is sufficient that the roller seats 210c and 210d have a shape, in which only a part of the roller 200b can be mounted thereon.

The ball bearing, the ball bearing seat, the ball bearing guide groove, the roller, the roller seat, the protrusion and the protrusion guide groove according to an exemplary embodiments may be made of resin so as to reduce the friction. As an example, the ball bearing and the roller may be made of ceramics, and the ball bearing seat, the ball bearing guide groove, the roller seat, the protrusion and the protrusion guide groove, which cause friction with respect to the ball bearing and the roller may be made of poly oxy methylene POM resin.

Hereinabove, even though all the constituent elements which form the embodiments of an exemplary embodiments are explained to be coupled as a single body or operating as a single body in combination, an exemplary embodiments is not necessarily limited to these embodiments. That is, within the purpose of the present invention, one or more of all the constituent elements can be selectively coupled to operate. In addition, it should be understood that the terms of "include", "form" or "have" used hereinabove mean that corresponding constituent elements can be inherent, unless otherwise defined, and thus shall be construed as that any other constituent elements are not excluded but may be further included. All the terms including all technical and scientific terms have, unless otherwise defined, the same meaning as commonly understood by a person skilled in the art, to which an exemplary embodiments belongs. Commonly used terms such as the terms defined in the dictionary shall be construed as matching the meanings in the context of the related art and shall not be construed as ideal or excessively formal meanings unless clearly defined in the present invention.

The above description has been made to the technical idea of the invention by way of example, and it would be apparent to a person skilled in the art that various modifications and variations can be made without departing from the essential characteristics of the invention. Therefore, the embodiments described herein are not to limit but to simply illustrate the technical idea of an exemplary embodiments and thus the scope of the technical idea of an exemplary embodiments is not limited to such embodiments. Therefore, it would be understood that the technical and protective scope of an exemplary embodiments shall be defined by the following claims and all modifications, changes and equivalences within the technical scope of an exemplary embodiments defined by the following claims belong to the technical scope of the present invention.

What is claimed is:

1. A linear vibration motor comprising:
a bracket;
a coil provided on the bracket;
a case covering the bracket;
a mass positioned in the case;
at least two or more springs, one end of each of which is connected to the mass and another end thereof is connected to one surface of the case;
a magnet coupled to the mass so as to be integrated therewith and facing the coil;
a plate coupled to the mass so as to be integrated therewith and positioned on top of the magnet to cut off magnetic flux leaking towards the top of the magnet; and
friction reducing parts each provided on the mass to reduce friction between the mass and the bracket,
wherein the friction reducing parts are positioned at corners of the mass and separated from each other, and each of the friction reducing parts includes only one rod-shaped roller, and
wherein the mass includes recessed seats separately formed by making grooves on the corners of the mass at which the friction reducing parts are placed and into which each of the friction reducing parts is at least partly inserted.

2. The linear vibration motor according to claim 1, wherein the mass is made of a tungsten material.

3. The linear vibration motor according to claim 1, wherein the bracket is made of a magnetic material.

4. The linear vibration motor according to claim 1, wherein guide grooves are formed on the mass or the bracket which faces the bracket or the mass on which the friction reducing parts are formed.

5. The linear vibration motor according to claim 1, wherein the roller is positioned at a corner of the mass in a direction parallel with the spring.

6. A linear vibration motor comprising:
a bracket;
a coil provided on the bracket;
a case covering the bracket;
a mass positioned in the case;
at least two or more springs, one end of each of which is connected to the mass and another end thereof is connected to one surface of the case;
a magnet coupled to the mass so as to be integrated therewith and facing the coil;
a plate coupled to the mass so as to be integrated therewith, and positioned on top of the magnet to cut off magnetic flux leaking towards the top of the magnet; and
friction reducing parts each provided to partly protrude from the mass to reduce friction between the mass and the bracket,
wherein the friction reducing parts are positioned at corners of the mass and separated from each other, and each of the friction reducing parts includes only one protrusion, and
wherein the bracket includes guide grooves respectively formed to guide the friction reducing parts which are formed on the mass facing the bracket.

7. A linear vibration motor comprising:
a case;
a coil provided in the case;
a mass positioned in the case;
at least two or more springs, one end of each of which is connected to the mass and another end thereof is connected to one surface of the case;
a magnet coupled to the mass so as to be integrated therewith and facing the coil;
a plate coupled to the mass so as to be integrated therewith and positioned on top of the magnet to cut off magnetic flux leaking towards the top of the magnet; and
friction reducing parts each provided to partly protrude from at least two of a bottom surface, a top surface and a side surface of the mass to reduce friction between the mass and the case,
wherein the friction reducing parts are positioned at corners of each of the surfaces and separated from each other, and each of the friction reducing parts includes only one protrusion, and
wherein one of the surfaces of the mass on which the friction reducing parts faces the bracket, and the bracket facing the one of the surfaces of the mass includes guide grooves respectively formed to guide the friction reducing parts which are formed on the one of the surfaces of the mass.

* * * * *